United States Patent [19]

Shirahata et al.

[11] 4,153,920
[45] * May 8, 1979

[54] RECORDING METHOD EMPLOYING A MAGNETIC RECORDING MEDIUM

[75] Inventors: Ryuji Shirahata; Tatsuji Kitamoto; Masaaki Suzuki; Shin-ichiro Dezawa, all of Odawara, Japan

[73] Assignee: Fuji Photo Film Co., Ltd., Kanagawa, Japan

[*] Notice: The portion of the term of this patent subsequent to Jun. 27, 1995, has been disclaimed.

[21] Appl. No.: 853,569

[22] Filed: Nov. 21, 1977

Related U.S. Application Data

[62] Division of Ser. No. 717,323, Aug. 24, 1976, Pat. No. 4,097,650.

[30] Foreign Application Priority Data

Aug. 23, 1975 [JP] Japan ................................. 50/103481

[51] Int. Cl.$^2$ ............................................. G11B 5/008
[52] U.S. Cl. ....................................... 360/55; 360/131; 427/131; 427/132; 427/250; 428/409; 428/900
[58] Field of Search ...................... 360/2, 134, 55, 131; 427/128, 129, 131, 132, 248, 250, 256; 428/336, 337, 339, 409, 457, 458, 461, 463, 464, 900

[56] References Cited

U.S. PATENT DOCUMENTS

| | | | |
|---|---|---|---|
| 3,342,632 | 9/1967 | Bates et al. | 360/134 |
| 3,442,686 | 5/1969 | Lenoble et al. | 427/129 X |
| 3,881,046 | 4/1975 | Akashi et al. | 428/216 |
| 3,967,025 | 6/1976 | Tanabe et al. | 428/155 |

*Primary Examiner*—George F. Lesmes
*Assistant Examiner*—Bruce H. Hess
*Attorney, Agent, or Firm*—Armstrong, Nikaido, Marmelstein & Kubovcik

[57] ABSTRACT

This invention relates to a magnetic recording medium comprising a ferromagnetic metal thin film as a magnetic recording layer on a non-magnetic flexible support, in which the surface roughness of the support is 0.10 $\mu$m or less and the period of the surface roughness is v/10$^6$ $\mu$m or less where v represents a relative speed between a magnetic head and magnetic recording medium by $\mu$m/sec. In the case of providing an undercoated layer between the magnetic recording layer and non-magnetic flexible support, the surface roughness of the undercoated layer is adjusted to 0.10 $\mu$m or less and the period of the surface roughness is adjusted to v/10$^6$ $\mu$m or less.

11 Claims, No Drawings

RECORDING METHOD EMPLOYING A MAGNETIC RECORDING MEDIUM

This is a division of application Ser. No. 717,323, filed Aug. 24, 1976 now U.S. Pat. No. 4,097,650.

BACKGROUND OF THE INVENTION

1. Field of the Invention

This invention relates to a magnetic recording medium having a ferromagnetic metal layer as a magnetic recording layer and more particularly, it is concerned with a magnetic recording medium having a good surface smoothness, high output and low noise.

2. Description of the Prior Art

Up to the present time, magnetic recording media of binder type have widely been used in which a powdered magnetic material such as $\gamma$-$Fe_2O_3$, Co-doped $Fe_2O_3$, $Fe_3O_4$, Co-doped $Fe_3O_4$, Berthollide compounds of $\gamma$-$Fe_2O_3$ and $Fe_3O_4$, $CrO_2$ and ferromagnetic alloy powders is dispersed in an organic binder such as vinyl chloride-vinyl acetate copolymers, styrene-butadiene copolymers, epoxy resins and polyurethane resins, coated onto a non-magnetic support and dried. Of late, on the other hand, magnetic recording media of the so-called non-binder type have become worthy of notice, in which no binder is used and a magnetic recording layer consisting of a ferromagnetic metal thin film is formed by the vapor deposition method such as vacuum evaporation, sputtering or ionic-plating, or by the plating method such as electroplating or electroless plating, as requirements for high density recording have risen, and various efforts have been made for the purpose of realizing the recording media of this type.

In the case of using these magnetic recording media as a magnetic tape, the relative speed of the tape and a reproducing head is usually 38 cm/sec for video signal recording (video tape recorder (VTR) for broadcasting), 11.1 m/sec for EIJA (Electronic Industries Association of Japan) Type I VTR, 10.4 m/sec, 7.8 m/sec and 6.9 m/sec for Small type VTR and, for audio signal recording, it is usually 38 cm/sec, 19 cm/sec and 9.5 cm/sec in open reel tapes and 9.8 cm/sec, 4.76 cm/sec and 2.38 cm/sec in cassette tapes.

Since in the prior art magnetic recording media of binder type, metal oxides having a smaller saturation magnetization than ferromagnetic metals are mainly used as a magnetic material, the thickness reduction required for high density has reached a limit because of resulting in lowering of the signal output and complicated processings and large special installations to recover the solvent and to prevent the public hazards are required for the production of such magnetic recording media. On the contrary, the magnetic recording media of non-binder type have advantages that the process for the production thereof is simple and an extreme thickness reduction is possible because a ferromagnetic metal having a larger saturation magnetization than metal oxides is formed as a thin film under such a state as being free from non-magnetic materials such as binders.

Magnetic recording media having a ferromagnetic metal layer as a magnetic recording layer have hitherto been considered to be suitable for high density recording, in particular, recording of short wavelengths of about 1 $\mu$m such as video signals, but, in the prior art magnetic recording media having a ferromagnetic metal layer, the output of video signals within a range of short recording wavelengths is not always so high as expected and noise level is considerably high. Therefore, these magnetic recording media are inferior to the prior art magnetic recording media of binder type in S/N ratio in some cases.

SUMMARY OF THE INVENTION

It is an object of the invention to provide a magnetic recording medium having a ferromagnetic metal layer as a magnetic recording layer.

It is another object of the invention to provide a magnetic recording medium of non-binder type having a good surface smoothness and being more suitable for high density recording than the prior art magnetic recording media of non-binder type.

It is a further object of the invention to provide a magnetic recording medium having a ferromagnetic metal thin film, which has a low noise level and an improved S/N ratio.

These objects can be attained by a magnetic recording medium comprising a ferromagnetic metal thin film as a magnetic recording layer on a non-magnetic flexible support, in which the surface roughness of the support is at most 0.10 $\mu$m and the period of the surface roughness is at most $v/10^6$ $\mu$m where v represents a relative speed between a magnetic head and magnetic recording medium by $\mu$m/sec, or a magnetic recording medium comprising a ferromagnetic metal thin film as a magnetic recording layer on a non-magnetic flexible support, in which an undercoated layer is provided between the support and magnetic recording layer, the surface roughness of the undercoated layer is at most 0.10 $\mu$m and the period of the surface roughness is at most $v/10^6$ $\mu$m.

DETAILED DESCRIPTION OF THE INVENTION

The inventors have made studies on a magnetic recording medium provided with a ferromagnetic metal layer as a magnetic recording layer on a flexible support and have consequently found that, when the substrate of a ferromagnetic metal layer has a surface roughness of 0.10 $\mu$m or less, the period of the surface roughness being $v/10^6$ $\mu$m or less, a very excellent magnetic recording medium for high density recording can be obtained with an increased video signal output within a range of short recording wavelengths as well as a markedly lowered noise level. In the case of providing a ferromagnetic metal layer by electroless plating, furthermore, the resulting magnetic recording medium is improved with respect to the squareness ratio of the magnetization curve (Br/Bm: ratio of residual magnetic flux density Br and maximum magnetic flux density Rm) and becomes suitable for high density magnetic recording, if the surface of the substrate is smooth.

In a case where a surface roughening treatment such as etching or ion bombardment is carried out during producing the magnetic recording medium of the invention, the support should be so controlled as to give a surface roughness of 0.10 $\mu$m or less and a period of the surface roughness of $v/10^5$ $\mu$m or less after the surface roughening treatment, or in a case where such a surface roughening treatment is not carried out, the magnetic recording medium may be produced by preparing previously and using a support having a surface roughness of 0.10 $\mu$m or less and a roughness period of $v/10^6$ $\mu$m or less.

In one embodiment of the magnetic recording medium according to the present invention, wherein an undercoated layer is provided on a support member and a ferromagnetic metal layer is further provided on the undercoated layer, the undercoated layer should have a surface roughness of 0.10 μm or less and a roughness period of $v/10^6$ μm or less irrespective of the surface roughness of the support and, if necessary, it may be subjected to a calendering treatment which is commonly employed in the production of magnetic recording media of coating type.

The above described surface roughness of the invention is a mean value of roughness heights on the surface of a nonmagnetic flexible support or the surface of an undercoated layer provided on such a support and the period of the surface roughness is a mean value of lengths of from peak to peak of roughness, which can be measured by the use of a scanning electron microscope, interference microscope (multiple beam interferometry, differential interference contrast method), stylus-type roughness tester or Topografiner (The Review of Scientific Instruments, Vol. 43, page 999-1011 (1972), American Institute of Physics). The surface roughness and period thereof on the surface of a support or the surface of an undercoated layer provided thereon can be measured, for example, from roughness of interference fringes, shift of interference fringes, degree of change of interference patterns, etc. in the case of using a multiple interference microscope or from pattern of surface roughness, etc. in the case of using a stylus-type roughness tester. Examination of this period in greater detail can be effected by measuring a nagative film of an interference pattern obtained by an interferometer by means of a densitometer, subjecting the results to A-D Conversion (Analog-Digital Conversion) and to Fourier Transformation by an electronic computer to seek components of frequency.

Useful examples of the support used in the present invention are cellulose acetate, nitrocellulose, ethyl cellulose, methyl cellulose, polyamides, polymethyl methacrylate, polytetrafluoroethylene, polytrifluoroethylene, polymers or copolymers of α-olefins such as ethylene and propylene, polymers or copolymers of vinyl chloride, polyvinylidene chloride, polycarbonates, polyimides, polyethylene terephthalate and polybutylene terephthalate.

As the undercoated layer of the present invention, there can be used ABS resins, epoxy resins, vinyl chloride-vinyl acetate copolymers, nitrocellulose, polyvinyl alcohol, gelatin, nitrile tubbers, and acrylic rubbers, for example, described in Japanese Patent Publication Nos. 10239/1970, 4071/1971, 21921/1971, 34161/1973, Japanese Patent Application (OPI) Nos. 10530/1972 and 3973/1974.

The ferromagnetic metal layer of the present invention consists of a thin film of at lease one of iron, cobalt, nickel and other ferromagnetic metals or alloys such as Fe—Co, Fe—Ni, Co—Ni, Fe—Si, Fe—Rh, Fe—V, Co—P, Co—B, Co—Si, Co—V, Co—Y, Co—La, Co—Ce, Co—Pr, Co—Sm, Co—Mn, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—Hg, Co—Ni—W, Co—Ni—Re, Co—Mn—P, Co—Zn—P, Co—Pb—P, Co—Sm—Cu, Co—Ni—Zn—P and Co—Ni—Mn—P formed by vapor deposition or plating. The vapor deposition method consists in depositing the object material or compound as a vapor or ionized vapor on a substrate in a gas or in vacuo, into which the vacuum vapor deposition method, sputtering method, ionic-plating method, chemical vapor deposition method can be classified. The plating method is a method comprising depositing the object material on a substrate from a liquid phase as in the electroplating method or electroless plating method.

The vapor deposition method is disclosed, for example, in L. Holland: "Vacuum Deposition of Thin Films" (Chapman & Hall Ltd., 1956); L. I. Maissel & R. Glang: "Handbook of Thin Film Technology" (McGraw Hill Co., 1970); and U.S. Pat. Nos. 2,671,034, 3,329,601, 3,342,632, 3,342,633, 3,516,860, 3,615,911, 3,625,849, 3,700,500, 3,772,174, 3,775,179, 3,787,237 and 3,856,579 and the plating method is disclosed, for example, in W. Goldie: "Metallic Coating of Plastics" (Electro-Chemical Publications Ltd., 1968) and U.S. Pat. Nos. 3,116,159, 3,138,479, 3,219,471, 3,227,635, 3,238,061, 3,267,017, 3,353,986, 3,360,397, 3,362,893, 3,416,932, 3,446,657, 3,549,417, 3,578,571, 3,637,471 and 3,672,968.

Preferably, the thickness of a non-magnetic flexible support is 4 to 50 μm, the thickness of an undercoated layer is 0 to 10 μm and the film thickness of a ferromagnetic metal layer is 0.05 to 2 μm. The shape of the magnetic recording medium may be any of tapes, sheets, cards and the like.

The magnetic recording medium of the present invention, comprising a ferromagnetic metal layer as a magnetic recording layer on a substrate, has a good surface smoothness, high output and low noise property and thus is suitable for use as a magnetic recording medium for high density short wavelength recording.

The present invention will be explained in greater detail by reference to the following Examples, which, however, are not intended to be interpreted as limiting the scope of the present invention.

EXAMPLE 1

Polyethylene terephthalate films (which will hereinafter be referred to as "PET film") of 25 μm in thickness and 2 inches in width, differing in surface roughness, were prepared and etched respectively in an aqueous solution of 10 mols/liter of sodium hydroxide at 80° C., thus obtaining 16 PET films differing in surface roughness and period therof depending on the immersion time or whether stirred or not, as shown in Table 1. The PET film etched in this way was adequately washed with water and then immersed successively in Catalyst 6F and Accelerator 19 of Shipley Co. (2300 Washington St., Newton, Massachussetts), the immersion time being 25 minutes in each case.

Then the substrate film was subjected to plating using the following plating bath and plating conditions to form a magnetic plating film of 0.12 μm, thus obtaining a magnetic tape:

| | | |
|---|---|---|
| Cobalt chloride (CoCl$_2$.6H$_2$O) | 0.04 | mol/litre |
| Sodium hypophoshpite (NaH$_2$PO$_2$.H$_2$O) | 0.05 | " |
| Ammonium chloride (NH$_4$Cl) | 0.20 | " |
| Citric acid (H$_3$C$_6$H$_5$O$_7$.H$_2$O) | 0.13 | " |
| Boric acid (H$_3$BO$_3$) | 0.50 | " |
| pH 7.5 (adjusted by NaOH) | | |
| Temperature 80° C. | | |

The thus obtained magnetic tape was then subjected to measurement of the output of 5NHz and modulation noise of 4 NHz using a home VTR of helical scan system (relative speed: 11.1 m/sec and 5.55 m/sec), obtaining results shown in Table 1. The output and modulation noise are shown by relative values.

Table 1

| Sample No. | Surface Roughness of PET (μm) | Period of Surface Roughness of PET (μm) | Magnetic Property | | At Relative Speed of 11.1 m/sec | | At Relative Speed of 5.55 m/sec | |
|---|---|---|---|---|---|---|---|---|
| | | | Coercive Force(Oe) | Squareness Ratio | Output (dB) | Modulation Noise (dB) | Output (dB) | Modulation Noise (dB) |
| 1 | 0.04 | 3 | 605 | 0.86 | 6.3 | 3 | 7.1 | 4 |
| 2 | 0.04 | 7 | 605 | 0.85 | 6.1 | 4 | 7.0 | 11 |
| 3 | 0.04 | 10 | 600 | 0.85 | 6.1 | 6 | 7.0 | 13 |
| 4 | 0.04 | 15 | 605 | 0.85 | 6.2 | 12 | 7.0 | 15 |
| 5 | 0.08 | 3 | 600 | 0.84 | 5.8 | 3 | 6.9 | 4 |
| 6 | 0.08 | 7 | 600 | 0.81 | 5.5 | 4 | 7.0 | 12 |
| 7 | 0.08 | 10 | 605 | 0.83 | 5.8 | 7 | 6.8 | 12 |
| 8 | 0.08 | 15 | 605 | 0.83 | 5.9 | 15 | 6.9 | 16 |
| 9 | 0.12 | 3 | 595 | 0.72 | 3.1 | 4 | 3.3 | 5 |
| 10 | 0.12 | 7 | 600 | 0.71 | 3.1 | 4 | 3.2 | 12 |
| 11 | 0.12 | 10 | 600 | 0.71 | 3.0 | 7 | 3.3 | 14 |
| 12 | 0.12 | 15 | 600 | 0.71 | 3.3 | 17 | 3.3 | 16 |
| 13 | 0.17 | 3 | 605 | 0.08 | 2.9 | 4 | 2.8 | 5 |
| 14 | 0.17 | 7 | 605 | 0.70 | 2.5 | 5 | 2.7 | 13 |
| 15 | 0.17 | 10 | 595 | 0.68 | 2.5 | 7 | 2.5 | 16 |
| 16 | 0.17 | 15 | 600 | 0.69 | 2.2 | 17 | 2.7 | 17 |

As can be seen from these results, the output is markedly increased and the modulation noise tends to be decreased when the surface roughness of PET is less than 0.10 μm and the modulation noise is very small when the period of the surface roughness is less than $v/10^6$ μm (11.1 μm where the relative speed is 11.1 m/sec and 5.6 μm where it is 5.55 m/sec).

EXAMPLE 2

On the 16 PET films differing in surface roughness and period thereof as shown in Table 1, prepared in Example 1, were provided ferromagnetic metal layers each consisting of a Co-Fe alloy (Fe: 30% by weight) by ionic-plating with an acceleration voltage of 3.0 KV, He gas pressure of 0.02 Torr and substrate temperature of 80° C. A magnetic layer having a thickness of 0.15 μm, coercive force of 410 Oe and squareness ratio of 0.73 was obtained and the electromagnetic conversion property was measured using a Standard-I type VTR (relative speed: 11.1 m/sec).

The signal output of 4MHz and modulation noise of 3 MHz are shown in Table 2.

Table 2

| Sample No. | Surface Roughness of PET (μm) | Period of Surface Roughness of PET (μm) | Output (dB) | Modulation Noise (dB) |
|---|---|---|---|---|
| 1 | 0.04 | 3 | 5.3 | 5 |
| 2 | 0.04 | 7 | 5.2 | 3 |
| 3 | 0.04 | 10 | 5.2 | 5 |
| 4 | 0.04 | 15 | 5.2 | 11 |
| 5 | 0.08 | 3 | 4.6 | 4 |
| 6 | 0.08 | 7 | 4.7 | 5 |
| 7 | 0.08 | 10 | 4.6 | 5 |
| 8 | 0.08 | 15 | 4.6 | 12 |
| 9 | 0.12 | 3 | 1.9 | 5 |
| 10 | 0.12 | 7 | 1.8 | 6 |
| 11 | 0.12 | 10 | 1.9 | 6 |
| 12 | 0.12 | 15 | 1.9 | 15 |
| 13 | 0.17 | 3 | 1.2 | 6 |
| 14 | 0.17 | 7 | 1.1 | 5 |
| 15 | 0.17 | 10 | 1.2 | 7 |
| 16 | 0.17 | 15 | 1.3 | 17 |

As evident from these results, the output is large and the modulation noise is small when the surface roughness of PET is less than 0.1 μm and the period is less than $v/10^6$ μm (11.1 μm in this Example).

EXAMPLE 3

The PET film having a surface roughness of 0.12 μm or 0.17 μm was chosen from the PET films prepared in Example 1, coated with a solution of 10 g of polyvinyl alcohol in 100 g of water and dried to form an undercoated layer of 2 μm in thickness, having a surface roughness and period thereof as shown in Table 3. On the PET film provided with the undercoated layer was formed a magnetic recording layer having a thickness of 0.2 μm and consisting of Co 30% by weight - Fe 70% by weight alloy by vacuum vapor deposition in a degree of vacuum of $5.0 \times 10^{-6}$ Torr to obtain a magnetic tape having a coercive force of 320 Oe and squareness ratio of 0.84. At that time, the vapor deposition was carried out with slanting the PET film to the evaporation beam by 45 degrees. The signal output of 4 MHz and modulation noise of 3 MHz were measured by means of a home VTR of helical scan system (relative speed: 5.55 m/sec) to obtain results as shown in Table 3.

Table 3

| Sample No. | Surface Roughness of Undercoated Layer (μm) | Period of Surface Roughness (μm) | Output (dB) | Modulation Noise (dB) |
|---|---|---|---|---|
| 1 | 0.07 | 3 | 4.3 | 3 |
| 2 | 0.07 | 7 | 4.2 | 9 |
| 3 | 0.07 | 10 | 4.2 | 12 |
| 4 | 0.13 | 3 | 1.1 | 4 |
| 5 | 0.13 | 7 | 1.0 | 13 |
| 6 | 0.13 | 10 | 1.1 | 16 |

As can be seen from the above table, the output and modulation noise are both excellent when the surface roughness of the undercoated layer on the PET substrate is less than 0.10 μm and the period thereof is less than $v/10^6$ μm (5.5 μm in this Example).

EXAMPLE 4

The PET film having a surface roughness of 0.12 μm or 0.17 μm was chosen from the PET films prepared in Example 1, coated with an about 5% solution of a copolymer of acrylonitrile, butadiene and styrene (ABS resin) in a mixed solvent of methyl ethyl ketone and ethylene dichloride to give a thickness of 4 μm on dry base, dried and further subjected to a super calender roll treatment to obtain an undercoated film having the surface property as shown in Table 4. The resulting film was then immersed in the following processing solutions for the purpose of the surface activation, the immersion time being 1 minute in each solution:

| Sensitizer | |
| --- | --- |
| SnCl$_2$.2H$_2$O | 20 g/litre |
| HCl | 10 ml/litre |
| CH$_3$(CH$_2$)$_{11}$OSO$_3$Na | 0.02 g/litre |
| Activator | |
| PdCl$_2$ | 0.5 g/litre |
| HCl | 5 ml/litre |

Then the surface activated film was subjected to magnetic plating using the following plating bath:

| | | |
| --- | --- | --- |
| Cobalt sulfate (CoSO$_4$.7H$_2$O) | 0.08 | mol/litre |
| Nickel sulfate (NiSO$_4$.7H$_2$O) | 0.01 | " |
| Sodium hypophosphite (NaHPO$_2$.H$_2$O) | 0.03 | " |
| Citric acid (H$_3$C$_6$H$_5$O$_7$.H$_2$O) | 0.09 | " |
| Ammonium sulfate ((NH$_2$)$_2$SO$_4$) | 0.23 | " |
| pH 8.2 | | |
| Temperature 80° C. | | |

The plating was carried out until the film thickness reached 0.15 μm. The signal output of 5 MHz and modulation noise of 4 MHz of the magnetic tape obtained in this way were measured using a home VTR of helical scan system (relative speed: 11.1 m/sec or 5.55 m/sec), obtaining results as shown in Table 4. The output and modulation noise are represented by relative values.

Table 4

| Sample No. | Surface Roughness of Undercoated Layer (μm) | Period of Surface Roughness (μm) | Magnetic Property Coercive Force (Oe) | Magnetic Property Squareness Ratio | Measured At Relative Speed of 11.1 m/sec Output (dB) | Measured At Relative Speed of 11.1 m/sec Modulation Noise (dB) | Measured At Relative Speed of 5.55 m/sec Output (dB) | Measured At Relative Speed of 5.55 m/sec Modulation Noise (dB) |
| --- | --- | --- | --- | --- | --- | --- | --- | --- |
| 1 | 0.06 | 2 | 430 | 0.82 | 5.4 | 4 | 4.8 | 3 |
| 2 | 0.06 | 4 | 430 | 0.81 | 5.3 | 4 | 4.7 | 4 |
| 3 | 0.06 | 8 | 430 | 0.81 | 5.3 | 5 | 4.8 | 4 |
| 4 | 0.06 | 15 | 435 | 0.74 | 5.4 | 11 | 4.6 | 13 |
| 5 | 0.13 | 2 | 430 | 0.81 | 3.0 | 3 | 2.3 | 4 |
| 6 | 0.13 | 4 | 435 | 0.80 | 3.1 | 5 | 2.5 | 5 |
| 7 | 0.13 | 8 | 440 | 0.81 | 3.0 | 6 | 2.5 | 4 |
| 8 | 0.13 | 15 | 435 | 0.75 | 2.9 | 12 | 2.2 | 13 |

As can be seen from these results, the output and modulation noise of the magnetic tape are very excellent when the surface roughness is less than 0.10 μm and the period is less than v/10$^6$ μm (11.1 μm where the relative speed is 11.1 m/sec or 5.6 μm where it is 5.55 m/sec).

What is claimed is:

1. In a method of recording or reproducing employing a magnetic recording medium wherein the relative speed between the magnetic recording head and the magnetic recording medium is v μm/sec, the improvement comprising employing as the magnetic recording medium, a non-binder type magnetic recording medium comprising a ferromagnetic metal thin film as a magnetic recording layer on a non-magnetic flexible support, the support having a surface roughness of 0.04 to 0.08 μm and a period of surface roughness of at most v/10$^6$ μm.

2. The method as claimed in claim 1, wherein the ferromagnetic metal thin film is selected from the group consisting of iron, cobalt, nickel, other ferromagnetic metal and ferromagnetic alloy.

3. The method as claimed in claim 2, wherein the ferromagnetic alloy is Fe—Co, Fe—Ni, Co—Ni, Fe—Si, Fe—Rh, Fe—V, Co—P, Co—B, Co—Si, Co—V, Co—Y, Co—La, Co—Ce, Co—Pr, Co—Sm, Co—Mn, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—Hg, Co—Ni—W, Co—Ni—Re, Co—Mn—P, Co—Zn—P, Co—Pb—P, Co—Sm—Cu, Co—Ni—Zn—P or Co—Ni—Mn—P.

4. The method as claimed in claim 1, wherein the ferromagnetic metal thin film is formed by vapor deposition or plating.

5. The method as claimed in claim 1, wherein the non-magnetic flexible support is a material selected from the group consisting of cellulose acetate, nitrocellulose, ethyl cellulose, methyl cellulose, polyamides, polymethyl methacrylate, polytetrafluoroethylene, polytrifluoroethylene, polymers and copolymers of α-olefins such as ethylene and propylene, polymers and copolymers of vinyl chloride, polyvinylidene chloride, polycarbonates, polyimides and polyesters such as polyethylene terephthalate and polybutylene terephthalate.

6. The method as claimed in claim 1, wherein the non-magnetic flexible support has a thickness of 4 to 50 μm.

7. The method as claimed in claim 1, wherein the magnetic recording medium is a tape, sheet or card.

8. The method as claimed in claim 1, wherein the ferromagnetic metal thin film has a thickness of 0.05 to 2 μm.

9. In a method of recording or reproducing employing a magnetic recording medium wherein the relative speed between the magnetic recording head and the magnetic recording medium is v μm/sec, the improvement comprising employing as the magnetic recording medium a non-binder type magnetic recording medium comprisng a ferromagnetic metal thin film as a magnetic recording layer on a non-magnetic flexible support, in which an undercoat layer is provided between the support and magnetic recording layer, the undercoat layer having a surface roughness of 0.06 to 0.07 μm and a period of surface roughness of at most v/10$^6$ μm.

10. The method as claimed in claim 9, wherein the undercoat layer is a material selected from the group consisting of acrylonitrile-butadiene-styrene copolymers, epoxy resins, vinyl chloride-vinyl acetate copolymers, nitrocellulose, polyvinyl alcohol, gelatin, nitrile rubbers and acrylic rubbers.

11. The method as claimed in claim 10, wherein the undercoated layer has a thickness of not more than 10 μm.

* * * * *